(12) United States Patent
Kulik et al.

(10) Patent No.: US 12,121,152 B2
(45) Date of Patent: Oct. 22, 2024

(54) TRANSPORTABLE SOFA

(71) Applicant: Lakewood Candies LLC, Lakewood, NJ (US)

(72) Inventors: Sima Kulik, Toms River, NJ (US); Ron Bak, Lake Como, NJ (US); Yehuda Ehrentreu, Lakewood, NJ (US)

(73) Assignee: Lakewood Candies LLC, Lakewood, NJ (US)

( * ) Notice: Subject to any disclaimer, the term of this patent is extended or adjusted under 35 U.S.C. 154(b) by 304 days.

(21) Appl. No.: 17/888,697

(22) Filed: Aug. 16, 2022

(65) Prior Publication Data

US 2024/0057777 A1 Feb. 22, 2024

(51) Int. Cl.
*A47C 17/04* (2006.01)
*F16B 12/10* (2006.01)
*F16B 12/44* (2006.01)

(52) U.S. Cl.
CPC .............. *A47C 17/04* (2013.01); *F16B 12/10* (2013.01); *F16B 12/44* (2013.01); *F16B 2012/106* (2013.01)

(58) Field of Classification Search
CPC .......... A47C 17/04; F16B 12/10; F16B 12/44; F16B 2012/106
See application file for complete search history.

(56) References Cited

U.S. PATENT DOCUMENTS

| 7,648,197 | B1* | 1/2010 | Delmestri | A47C 17/16 297/63 |
| 2013/0193728 | A1* | 8/2013 | Wang | B65D 85/70 297/378.1 |
| 2020/0221877 | A1* | 7/2020 | Hirschhaut | A47C 17/04 |
| 2020/0375362 | A1* | 12/2020 | Hale | A47C 17/04 |

* cited by examiner

*Primary Examiner* — Mark R Wendell
(74) *Attorney, Agent, or Firm* — Weiss & Arons LLP

(57) ABSTRACT

Systems and methods for a transportable sofa are provided. The sofa may include a seating unit that comprises a base, a back, a first set of hinges, and a second set of hinges. The sofa may be configured such that in a folded position the back lies in a substantially flat position, and the back unfolds to an unfolded position by swinging the top edge of the back upward and pivoting the back into a substantially upright position. The second set of hinges may include a left side hinge and a right side hinge that may be configured to fold at pivot points when the back is in the folded position, unfold at the pivot points when the back is in the unfolded position, and secure the back in the substantially upright position and prevent the back from pivoting further backwards. The sofa may also include a right armrest unit, a left armrest unit, a set of cushions, and a plurality of legs.

27 Claims, 8 Drawing Sheets

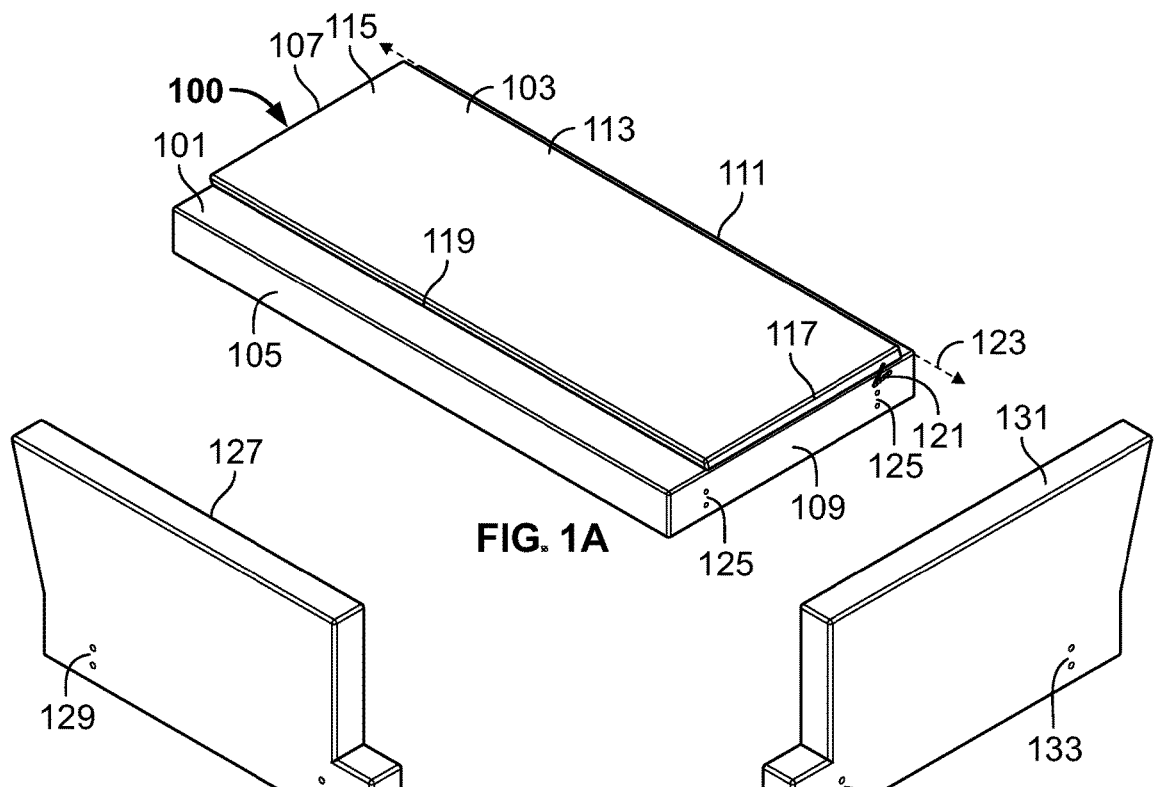
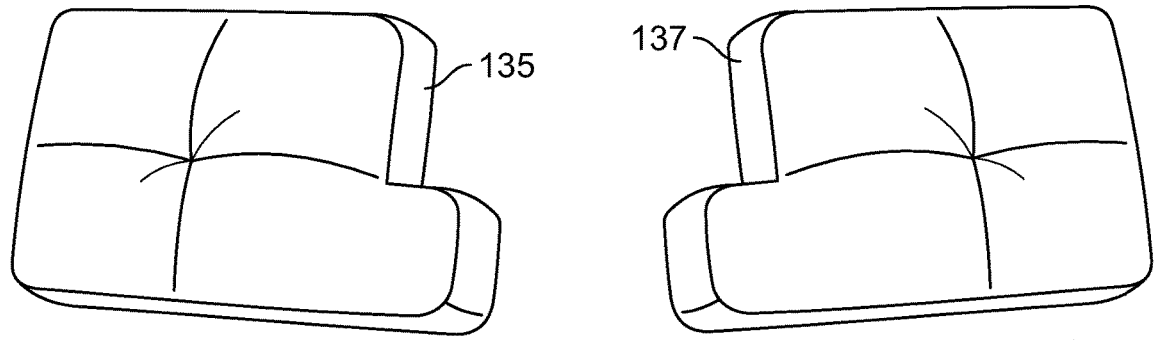
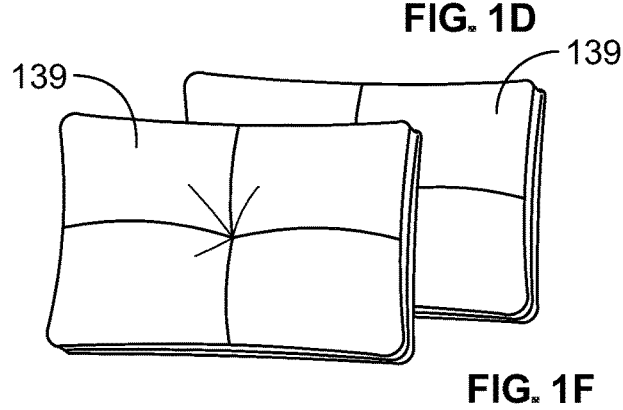
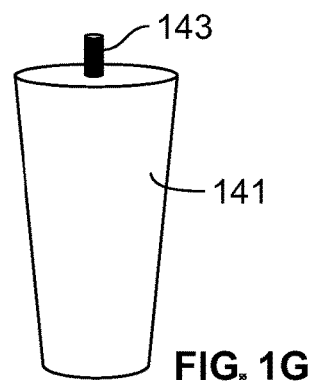

TRANSPORTABLE SOFA

FIELD OF TECHNOLOGY

Aspects of the disclosure relate to seating apparatus. Specifically, aspects of the disclosure relate to transportable sofas.

BACKGROUND OF THE DISCLOSURE

Functional furniture is a staple of nearly every household. For example, seating apparatus, such as chairs, couches, sofas, and the like, are found and enjoyed in living rooms across the world.

Transportation of seating apparatus presents unique challenges. While the seating apparatus can be made small and therefore easy to transport, a small seating apparatus has limited seating capability and therefore limited comfort and functionality. Inversely, larger seating apparatus may provide more comfortable and expansive seating but may be very difficult to transport.

It would be desirable, therefore, to provide systems and methods for seating apparatus that are easy to transport yet provide comfortable and expansive seating.

SUMMARY OF THE DISCLOSURE

Aspects of the disclosure relate to a transportable sofa. The sofa may include a seating unit. The seating unit may include a base. The base may define a front edge, a left edge (with respect to a viewer facing the front of the sofa), a right edge, and a rear edge. The seating unit may include a back. The back may define a bottom edge, a left edge (with respect to a viewer facing the front of the sofa), a right edge, and a top edge. The seating unit may also include a first set of hinges and a second set of hinges.

The first set of hinges may define a longitudinal axis and may connect the rear edge of the base to the bottom edge of the back along the longitudinal axis. The first set of hinges may be configured so that in a folded position the back of the seating unit lies in a substantially flat position wherein the top edge of the back rests atop the base. The first set of hinges may also be configured so that the back unfolds to an unfolded position by swinging the top edge of the back upward and pivoting the back about the longitudinal axis into a substantially upright position.

The second set of hinges may include a left side hinge and a right side hinge. The left side hinge may include a first arm portion that is connected to the left edge of the back and a second arm portion that is connected to the left edge of the base. The first arm portion of the left side hinge may be connected to the second arm portion of the left side hinge at a pivot point.

The right side hinge may include a first arm portion that is connected to the right edge of the back and a second arm portion that is connected to the right edge of the base. The first arm portion of the right side hinge may be connected to the second arm portion of the right side hinge at a pivot point.

The left side hinge and the right side hinge may be configured to fold at the pivot points when the back is in the folded position and unfold at the pivot points when the back is in the unfolded position. When the back is in the unfolded position, the left side hinge and the right side hinge may provide structural support for the back in the substantially upright position and may prevent the back from pivoting further backwards about the longitudinal axis.

The sofa may also include a right armrest unit and a left armrest unit. The right armrest unit may be attachable via screws to the right edge of the base. The left armrest unit may be attachable via screws to the left edge of the base.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 1A-1G show illustrative apparatus in accordance with principles of the disclosure;

DETAILED DESCRIPTION OF THE DISCLOSURE

Figure 2:
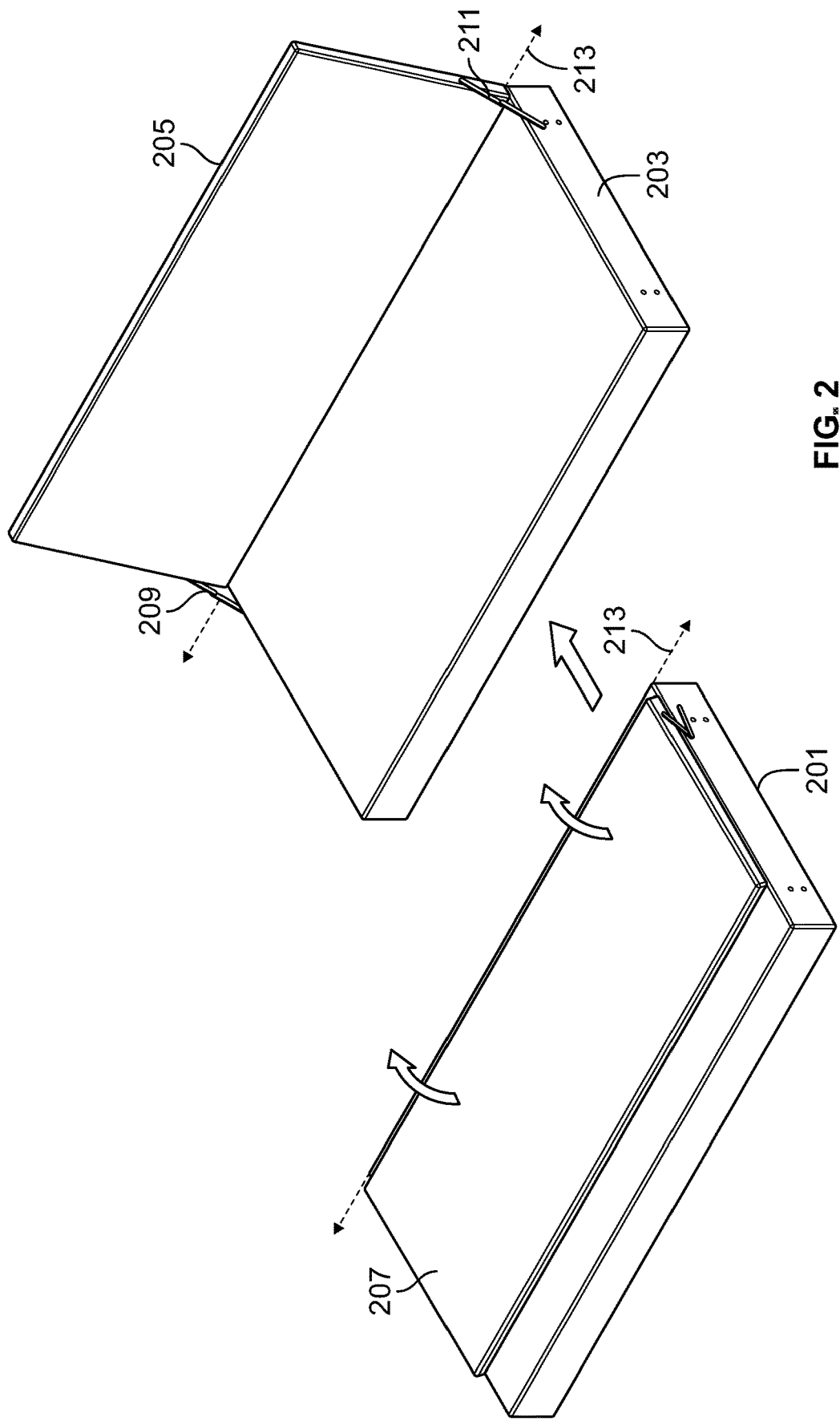
FIG. 2 shows an illustrative apparatus in accordance with principles of the disclosure.

Aspects of the disclosure relate to systems and methods for providing a transportable sofa. The sofa may, in some embodiments, be provided as a kit. The systems and methods may provide a seating apparatus with the comfort and functionality of a larger, multi-person, seating apparatus while achieving a degree of transportability typically associated with smaller units. Moreover, the seating apparatus may be assembled with ease and in a small number of steps.

The sofa may include a seating unit. The seating unit may include a base. The base may define a front edge, a left edge, a right edge, and a rear edge. Left and right, as used herein, may refer to a frame of reference from the point of view of an observer facing the front of the sofa. The seating unit may include a back. The back may define a bottom edge, a left edge, a right edge, and a top edge. The seating unit may also include a first set of hinges and a second set of hinges.

The first set of hinges may define a longitudinal axis and connect the rear edge of the base to the bottom edge of the back along the longitudinal axis. The first set of hinges may be configured so that in a folded position the back lies in a substantially flat position wherein the top edge of the back rests atop the base. The first set of hinges may also be configured so that the back unfolds to an unfolded position by swinging the top edge of the back upward and pivoting the back about the longitudinal axis into a substantially upright position. Substantially upright may be about 90-95 degrees from the base. Substantially upright may, in some embodiments, include a slight recline (e.g., between 95 and 115 degrees from the base). A slight recline may be advantageous for comfort purposes. A slight recline may also be advantageous for structural purposes, e.g., to allow full extension of the second set of hinges and facilitate support of the back by the second set of hinges. A slight recline may also be advantageous for keeping the back in the upright position and preventing the back from folding. Substantially upright may, in certain embodiments, include any angle for a sofa back that provides a comfortable seating position.

In some embodiments, the first set of hinges may include one or more piano hinges. The one or more piano hinges may, in certain example embodiments, include three piano hinges. Each piano hinge may, in some embodiments, be substantially 9¹⁰⁄₁₆" long. Each piano hinge may also be split along the longitudinal axis into two adjoining leaves. Each leaf may, in some embodiments, be substantially ¹⁰⁄₁₆" wide. In other embodiments, the first set of hinges may include a single hinge. In other embodiments, the first set of hinges may include two hinges. In still other embodiments, the first set of hinges may include four or more hinges.

In certain embodiments the first set of hinges may be provided fully attached to the base and back of the seating unit. In other embodiments the first set of hinges may be provided unattached to the base and/or back of the seating unit. For example, a first leaf of each piano hinge may need to be screwed into the base of the seating unit, and/or a second leaf of each piano hinge may need to be screwed into the back of the seating unit.

The second set of hinges may include a left side hinge and a right side hinge. The left side hinge may include a first arm portion that is connected to the left edge of the back and a second arm portion that is connected to the left edge of the base. An edge of the back and/or the base may include a side face of the back and/or the base. In some embodiments, an edge of the base and/or the back may include a perimeter of a top face that is near the side face of the back and/or the base. The first arm portion of the left side hinge may be connected to the second arm portion of the left side hinge at a pivot point.

The right side hinge may include a first arm portion that is connected to the right edge of the back and a second arm portion that is connected to the right edge of the base. The first arm portion of the right side hinge may be connected to the second arm portion of the right side hinge at a pivot point.

The left side hinge and the right side hinge may be configured to fold at the pivot points when the back is in the folded position and unfold at the pivot points when the back is in the unfolded position. When the back is in the unfolded position, the left side hinge and the right side hinge may provide structural support for and/or secure the back in the substantially upright position. The left side hinge and the right side hinge may prevent the back from pivoting further backwards, beyond the substantially upright position, about the longitudinal axis. The left side hinge and the right side hinge may also prevent the back from pivoting forwards, once the couch is in an unfolded position.

In another embodiment the left side hinge and the right side hinge may lock the sofa in an unfolded position. The hinges may need to be unlocked in order to close the sofa.

In certain embodiments, the left side hinge and the right side hinge may be pivot hinges. Pivot hinges may include hinges that fold at a pivot point. Pivot hinges may include cabinet hinges, knife hinges, or any other suitable hinges.

In certain embodiments the second set of hinges may be provided fully attached to the base and back of the seating unit. In other embodiments, the second set of hinges may be provided unattached to the base and/or back of the seating unit. Each of the second set of hinges may include a first end and a second end. The first end may need to be screwed into the base of the seating unit. The second end may need to be screwed into the back of the seating unit.

In an embodiment, the second set of hinges may be replaced by another suitable set of supports. The supports may be other suitable types of hinges. The supports may be a set of straps. There may be a right side strap and a left side strap. Each strap may have two ends, a first end and a second end. The first end of the right side strap may be attached to the right side of the base. The second end of the right side strap may be attached to right side of the back. The first end of the left side strap may be attached to the left side of the base. The second end of the left side strap may be attached to the left side of the back. When the back is in the unfolded position, the left side strap and the right side strap may provide structural support for and/or secure the back in the substantially upright position.

The set of supports may, in certain preferred embodiments, be separate from the armrests. Having supports separate from the armrests may facilitate more comfortable and stable armrests, a more robust support system, and/or increased aesthetics by concealing the supports behind the armrests and/or cushions. In some embodiments, the set of supports may be built into and/or may double as armrests.

In another embodiment, the base of the seating unit may be connected to the back of the seating unit using a tongue and groove mechanism, a ball joint mechanism, or any other suitable mechanism for connecting the base to the back.

The sofa may also include a right armrest unit and a left armrest unit. The right armrest unit may be attachable via screws to the right edge of the base. The left armrest unit may be attachable via screws to the left edge of the base.

In other embodiments the right armrest unit and the left armrest unit may be attachable to the base via other suitable connecting mechanisms. The connecting mechanism may include brackets. For example, a bracket may span the armrest and the base and connect the armrest to the base. The connecting mechanism may also, for example, include a locking latch between the armrest and the base or a track system on the base into which the armrests slide.

The sofa may, in some embodiments, include a plurality of legs. Each leg may include a threaded rod extending from a top of the leg. The right armrest unit and the left armrest unit may include a plurality of pre-drilled sockets that are configured to accept the threaded rods. The plurality of legs may be configured to be installed in the sofa, independently of any fasteners aside from the threaded rods, via the threaded rods screwing into the pre-drilled sockets.

In some embodiments the plurality of legs may be connected to the base. The right side of the base may include a plurality of predrilled sockets. The left side of the base may include a plurality of predrilled sockets. Each leg may include a threaded rod extending from a top of the leg. The predrilled sockets in the base may be configured to accept the threaded rods.

In other embodiments the plurality of legs may be attached to the armrest units or the base using brackets or any other suitable connecting mechanism.

The sofa may, in some embodiments, include a plurality of cushions. The plurality of cushions may include a set of bottom cushions and a set of back cushions. The set of bottom cushions may be configured to be installed in a flat position atop the base when the back is in the unfolded position. The set of back cushions may be configured to be installed in an upright position against the back when the back is in the unfolded position. In some embodiments the set of bottom cushions may be one long cushion. The set of back cushions may be one long cushion. In other embodiments, the cushions may rest on the back and/or base. In other embodiments, the cushions may attach to the sofa with Velcro, snaps, zippers, adhesive, or any other suitable attaching mechanism.

The cushions may include an inner layer of foam. The cushions may include springs. In some embodiments, the cushions may be provided compressed, and the assembly process may include decompressing the cushions. The cushions may include an outer layer of any suitable material. The material may, for example, be an authentic or faux velvet, suede, leather, wool, polyester blend, polyester, or other suitable natural or synthetic fabric.

In some embodiments the cushions may come attached to the back and/or base of the sofa. In certain embodiments, when the cushions come attached, the base and back may not come connected, in order to facilitate fitting the sofa into the desired sized box. In other embodiments the cushions may come unattached to the back and/or base of the sofa.

In certain embodiments, the sofa may, in an assembled form, have dimensions of substantially 23"D (depth), 57.5"W (width), and/or 30.5"H (height). The sofa may have a backrest height of substantially 18" and an armrest height (from the floor) of substantially 24.25". The sofa may, in these embodiments, be a loveseat that may seat two people comfortably. Other embodiments may provide sofas in an armchair size (i.e., designed for one person), full size (designed for three people) or any other suitable configuration. In the assembled form, the back may be in the unfolded position, the right and left armrest units may be attached to the base, and the cushions and legs may be installed. The sofa may, in certain embodiments, weigh approximately 64 pounds. In other embodiments, the sofa may weigh approximately 70 pounds. The weight of the sofa may be designed to be in conformance with applicable restrictions of a shipping carrier.

In another embodiment, the sofa may, in an assembled form, have dimensions of substantially 26"D (depth)×57"W (width)×30.5"H (height).

In certain embodiments the sofa may, in a disassembled form, fit in a single box. The single box may have dimensions of about 51"×23"×14". In other embodiments, the box may be smaller, or larger. The dimensions of the single box may be designed to be in accordance with external guidelines, such as size restrictions of a shipping carrier (e.g., FedEx Express® U.S., UPS®, and the like). For example, a carrier, such as FedEx Express® U.S., may set maximum limits of 119" length, 165" length plus girth, and 150 pounds. (Girth of a box may be calculated by adding two times the width plus two times the height of the box.) A package exceeding any of these maximum limits may be refused by the carrier or may be subject to a large overage fee. The carrier may also, for example, set a maximum length of 108" over which a package may need prior authorization. The carrier may establish an "oversize category" that may be subject to certain fees. The oversize category may, for example, include boxes between 96" and 108" long, and may also include boxes with a length plus girth between 130" and 165".

An advantage of the transportable sofa disclosed herein may be that, in a disassembled form, its dimensions may facilitate its ability to fit in a single box that is within desired shipping restrictions. For example, it may, in certain illustrative scenarios, be desired to configure the sofa in its disassembled form to fit in a box that is less than 119" length and 165" length plus girth, which may be the maximum dimensions for a carrier. It may be desirable to fit in a box with a length less than 108", so as not to need prior authorization. It may be further desirable to fit in a box with a length that is less than 96" and a length plus girth that is less than 130", so as to avoid being in an oversize category and incurring overage fees. It may be still further desirable for the box to be even smaller than the desired limit to account for bulging of the box when loaded and handled. For example, it may be desired for the box to have a length that is less than 95" and/or a length plus girth that is less than 129" (or, in other embodiments, 129.5", 128.5", 128", or other suitable buffer to account for bulging). In other embodiments, it may be desired to ship the sofa in a box that conforms to other restrictions, such as that of other carriers, content weight, shipping distances (including domestic/international status), or updated shipping guidelines.

In certain embodiments, the disassembled sofa may be configured to fit in a box with a predetermined size. In the disassembled form, the back may be in the folded position, the right and left armrest units may be unattached to the base, and the cushions and legs may be uninstalled. The right and left armrests may, in certain embodiments, be configured to be placed inside the base in order to facilitate fitting the disassembled sofa into the box.

In some embodiments, the back may be less than 2" thick. In certain embodiments, the back may be substantially 1.5" thick. Providing such a thin back that folds flat onto the base may contribute to the compact nature, and therefore the ease and efficiency of transport, of the folded sofa. At the same time, although the back may be relatively thin, the unique combinations of hinges may provide a robust and sturdy back support when the back is unfolded.

In other embodiments the back may be more than 2" thick. In order to compensate for the thicker back the base may be made thinner in order to fit into the desired box. Providing a thick back that folds flat onto the thin base may contribute to the compact nature, and therefore the ease of transport, of the folded sofa. At the same time, although the base may be thin, the unique combination of the hinges may provide a robust and sturdy seating apparatus when the back is unfolded.

In certain embodiments the hardware of the sofa may be hidden from view. The hardware may be hidden from front view, side view, and/or back view. Having no hardware showing may increase the aesthetics of the sofa and may allow for the sofa to be placed anywhere, without the need to account for hiding the hardware from view.

In certain embodiments, the sofa may be provided to a customer in a disassembled form. Completing assembly of the sofa may include unfolding the back from the folded position to the unfolded position, attaching the right and left armrest units to the base, and installing the cushions and legs.

A method for providing a sofa with a large footprint in small packaging is provided. The method may include attaching the back to the base with the first set of hinges and the second set of hinges to form a seating unit. The method may include folding the back into the folded position. The method may include placing the folded seating unit in a box with maximum dimensions of 51"×23"×14". The box may bulge once the sofa is placed in the box. In other embodiments, the box may be 51"×24"×14.5". The method may further include placing in the box the right armrest unit, the left armrest unit, the plurality of legs, and/or the plurality of cushions.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIGS. 1A-1G show illustrative apparatus in accordance with principles of the disclosure. FIGS. 1A-1G may show illustrative components of a transportable sofa kit.

FIG. 1A shows seating unit 100. Seating unit 100 may include base 101 and back 103. Base 101 may define front edge 105, left edge 107, right edge 109, and rear edge 111. Back 103 may define bottom edge 113, left edge 115, right edge 117, and top edge 119.

Seating unit 100 in FIG. 1A includes right side hinge 121 connecting right edge 109 and right edge 117. Seating unit 100 may include an opposing left side hinge (not shown) connecting left edge 107 and left edge 115.

Seating unit 100 in FIG. 1A includes a first set of hinges (not shown) that define longitudinal axis 123 and connect rear edge 111 and bottom edge 113.

Seating unit 100 in FIG. 1A may include pre-drilled sockets 125. Pre-drilled sockets 125 may be configured to receive screws that may be used to attach armrest units.

Seating unit 100 in FIG. 1A may be shown in a folded position. Top edge 119 may therefore be shown resting atop base 101. Right side hinge 121 may therefore also be shown in a folded state.

FIG. 1B shows right armrest unit 127. Right armrest unit 127 may include pre-drilled sockets 129. Screws may be used to attach right armrest unit 127, via pre-drilled sockets 129, to right edge 109 of base 101. The screws may be provided with the kit.

FIG. 1C shows left armrest unit 131. Left armrest unit 131 may include pre-drilled sockets 133. Screws may be used to attach left armrest unit 131, via pre-drilled sockets 133, to left edge 107 of base 101. The screws may be provided with the kit.

FIG. 1D and FIG. 1E show cushions 135 and 137, respectively. Cushions 135 and 137 may be part of the set of bottom cushions which may be configured to be installed in a flat position atop base 101 when back 103 is in the unfolded position.

FIG. 1F shows a set of back cushions 139. Set of back cushions 139 are configured to be installed in an upright position against back 103 when back 103 is in the unfolded position FIG. 1G shows sofa leg 141. Sofa leg 141 may include threaded rod 143 extending from a top of sofa leg 141. Threaded rod 143 may be configured to screw into pre-drilled sockets (not shown) which may be included at the bottom of right armrest unit 127 and left armrest unit 131.

FIG. 2 shows an illustrative seating unit in a folded position 201 and after transitioning to an unfolded position 203. The unfolding may be accomplished by lifting the back upward and pivoting the back about longitudinal axis 213. Back 205 of the seating unit is shown in a substantially upright position in unfolded position 203 as opposed to the substantially horizontal position of back 207 in folded position 201. FIG. 2 also shows that left and right side hinges (209 and 211, respectively) are unfolded when the seating unit is in unfolded position 203 and prevent back 205 from pivoting further about longitudinal axis 213.

Figure 3:
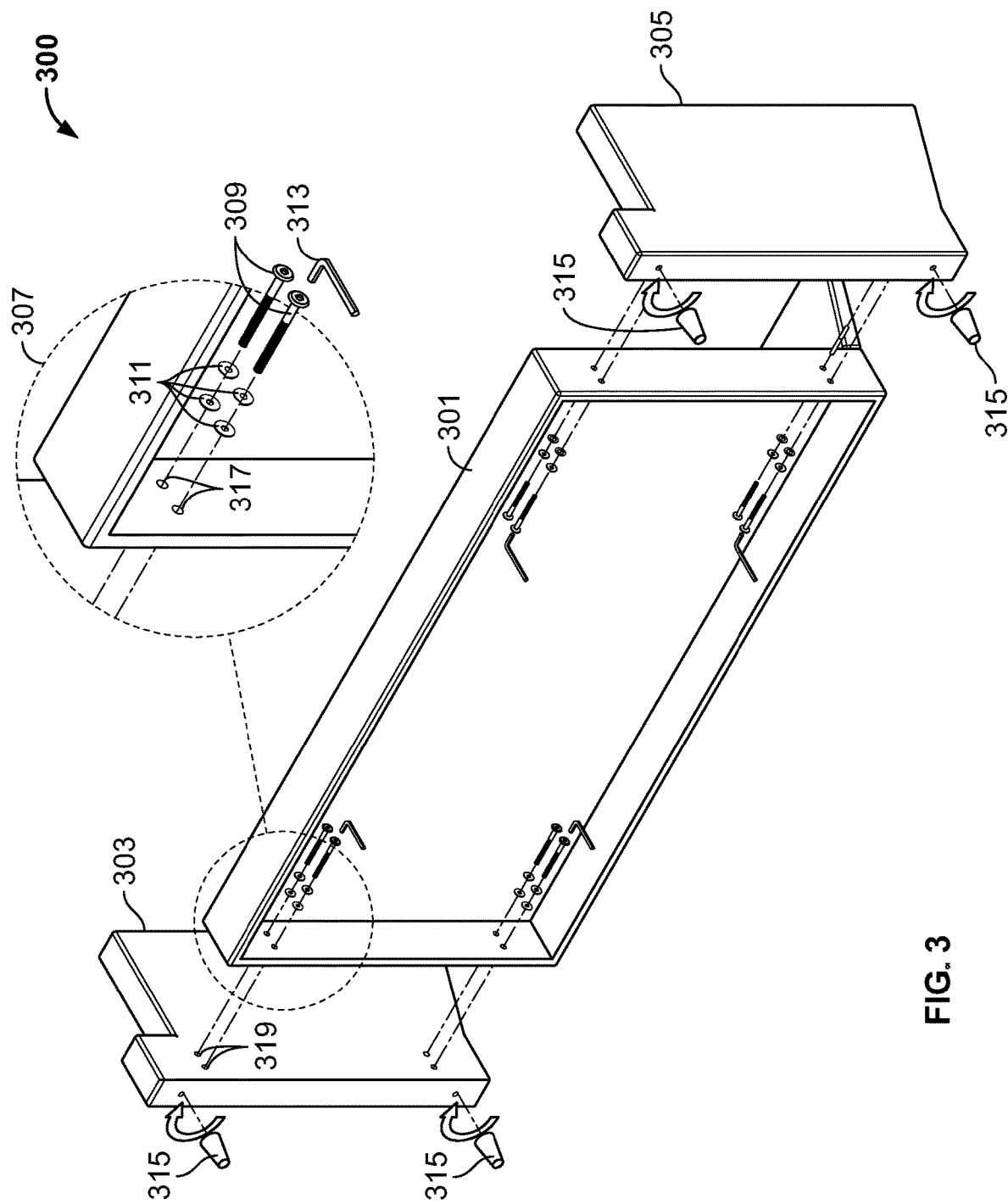
FIG. 3 shows another illustrative apparatus in accordance with principles of the disclosure.

FIG. 3 shows illustrative sofa 300 being assembled from a kit in accordance with principles of the disclosure. Sofa 300 may include seating unit 301, which is shown in an unfolded position. Left armrest unit 303 and right armrest unit 305 may be attached to the base of seating unit 301 via a series of screws. Enlarged view 307 shows two screws 309 being screwed through sockets 317 in the base of seating unit 301 and being received into sockets 319 of left armrest unit 303, thereby attaching left armrest unit 303 to seating unit 301. Washers 311 may be included in conjunction with the screws. Similar attachments may be performed at each of the four corners of the sofa.

In this example embodiment, a total of eight screws (and, optionally, 16 washers) may be used to assemble the sofa, without necessitating any additional hardware. The kit may include the eight screws and 16 washers. The kit may also, optionally, include hex wrench 313 for performing the assembly.

The kit may also include legs 315. Legs 315 may include built-in threaded rods that screw into sockets on the bottom of left armrest unit 303 and right armrest unit 305. Legs 315 may, in certain embodiments, be screwed into the armrest units via rotating the legs by hand, without the need for any additional tools or hardware.

Figure 4:
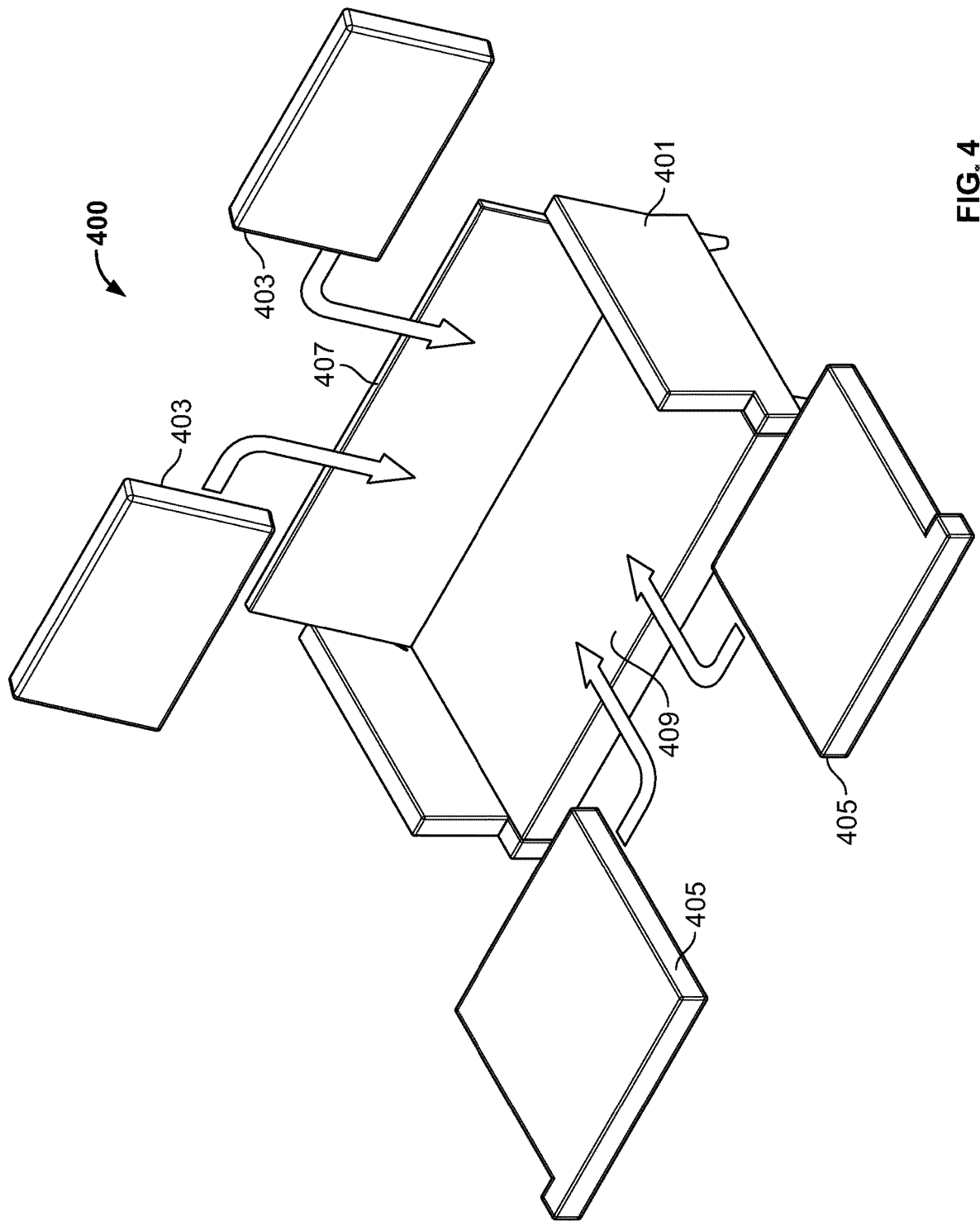
FIG. 4 shows yet another illustrative apparatus in accordance with principles of the disclosure.

FIG. 4 shows illustrative sofa 400 being assembled in accordance with principles of the disclosure. Frame 401 may constitute a partially assembled sofa and may include the seating unit with the back unfolded, the armrest units attached via screws, and the legs screwed into the armrests. The set of back cushions 403 may be installed upright against back 407 and the set of bottom cushions 405 may be installed in a flat position atop base 409.

Figure 5:
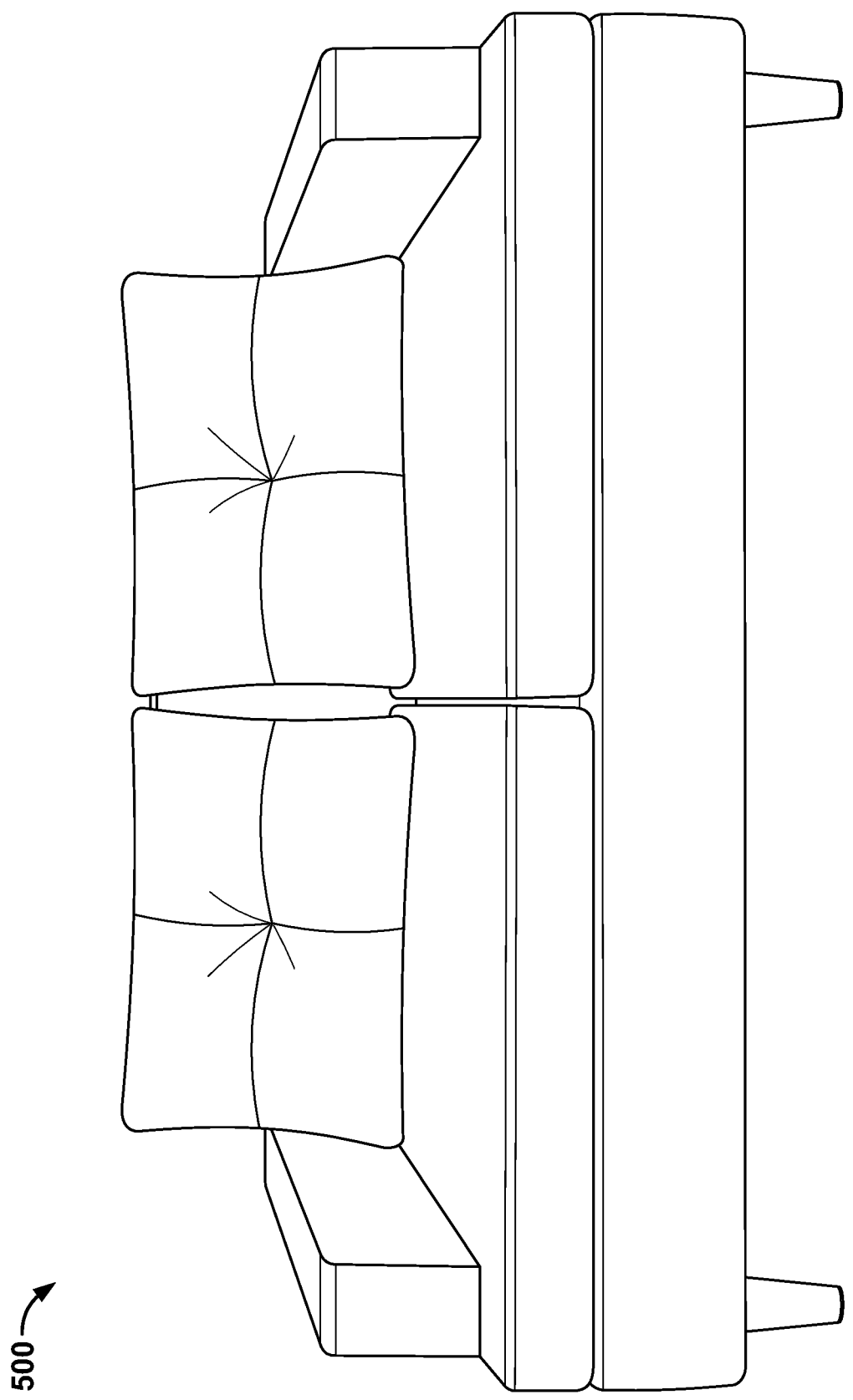
FIG. 5 shows still another illustrative apparatus in accordance with principles of the disclosure.

FIG. 5 shows illustrative sofa 500 in accordance with principles of the disclosure. Sofa 500 shows an example of a fully assembled sofa. Sofa 500 shows that even after starting in a very compact disassembled state, as shown in FIGS. 1A-1G, and after the quick and simple assembly steps shown in FIGS. 2-4, sofa 500 is a comfortable and fully functional sofa capable of seating multiple people. It should also be noted that the hinges and other hardware components are completely hidden from view when the sofa is completely assembled.

Figure 6A:
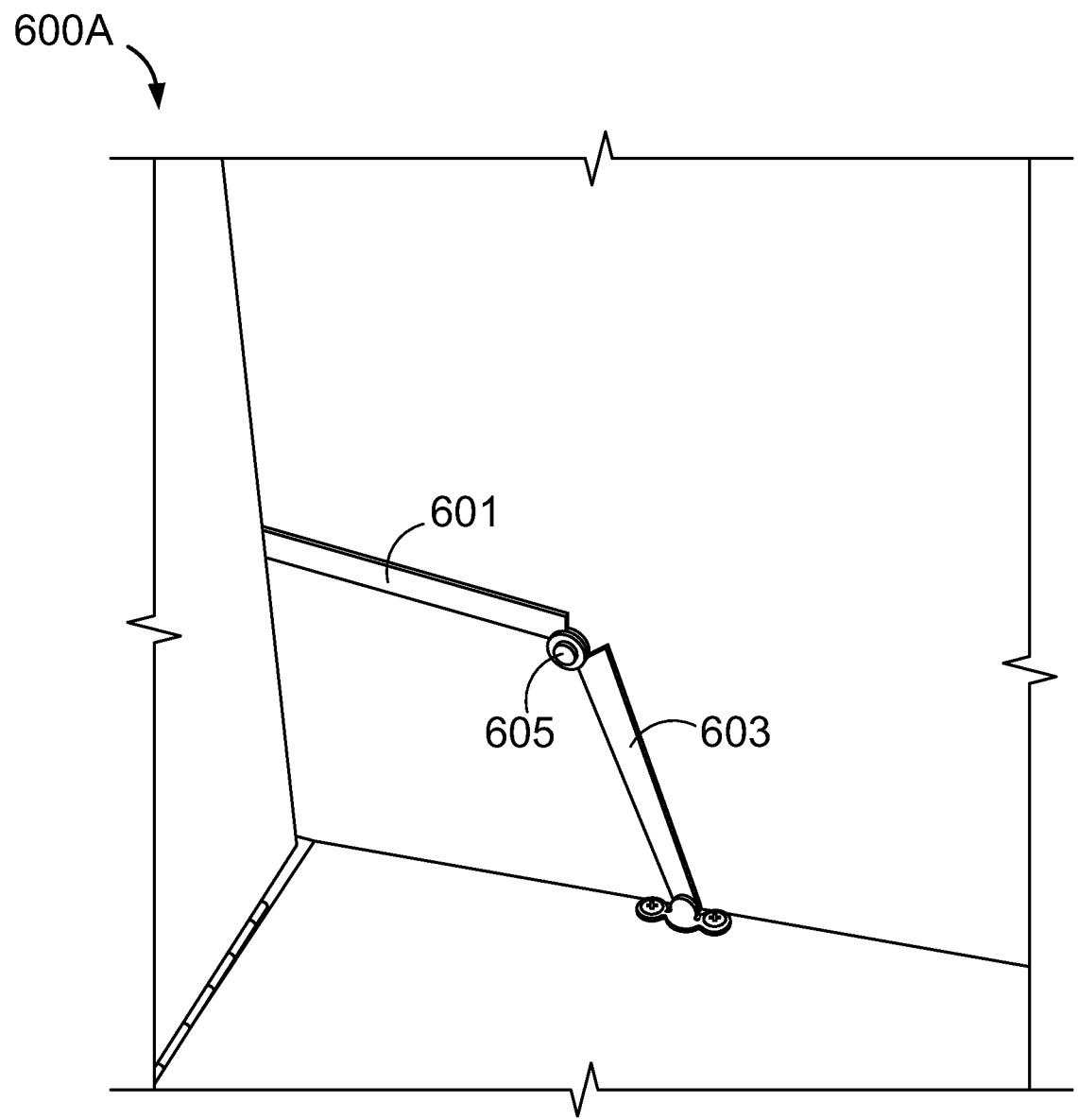
FIGS. 6A-6B show another illustrative apparatus in accordance with principles of the disclosure.

FIG. 6A shows illustrative hinge 600A in accordance with principles of the disclosure. Hinge 600A may be, or may be similar to, one of the second set of hinges. In particular, hinge 600A may be a pivot hinge. Hinge 600A may include first arm portion 601 and a second arm portion 603. First arm portion 601 and second arm portion 603 may be connected at pivot point 605. Hinge 600A may close inwardly, such that when hinge 600A is in folded position the inside edge of end of first arm portion 601 may touch the inside edge of second arm portion 603. Hinge 600A may fold upwards when the sofa is folded.

Figure 6B:
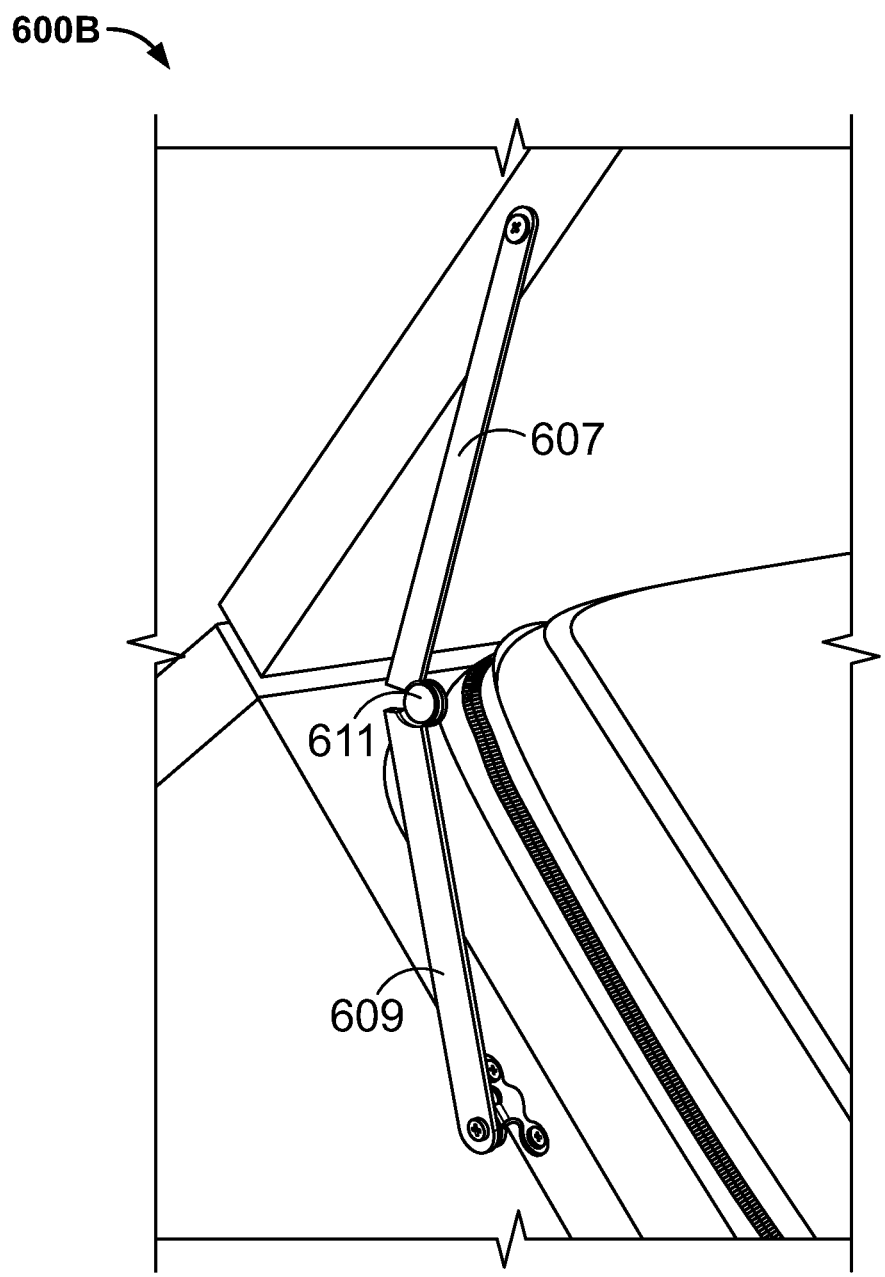

FIG. 6B shows illustrative hinge 600B in accordance with principles of the disclosure. Hinge 600B may be, or may be similar to, one of the second set of hinges. In particular, hinge 600B may be a pivot hinge. Hinge 600B may include first arm portion 607 and a second arm portion 609. First arm portion 607 and second arm portion 609 may be connected at pivot point 611. Hinge 600B may close inwardly, such that when hinge 600B is in folded position the inside edge of end of first arm portion 607 may touch the inside edge of second arm portion 609. Hinge 600B may fold downwards when the sofa is folded.

Figure 7:
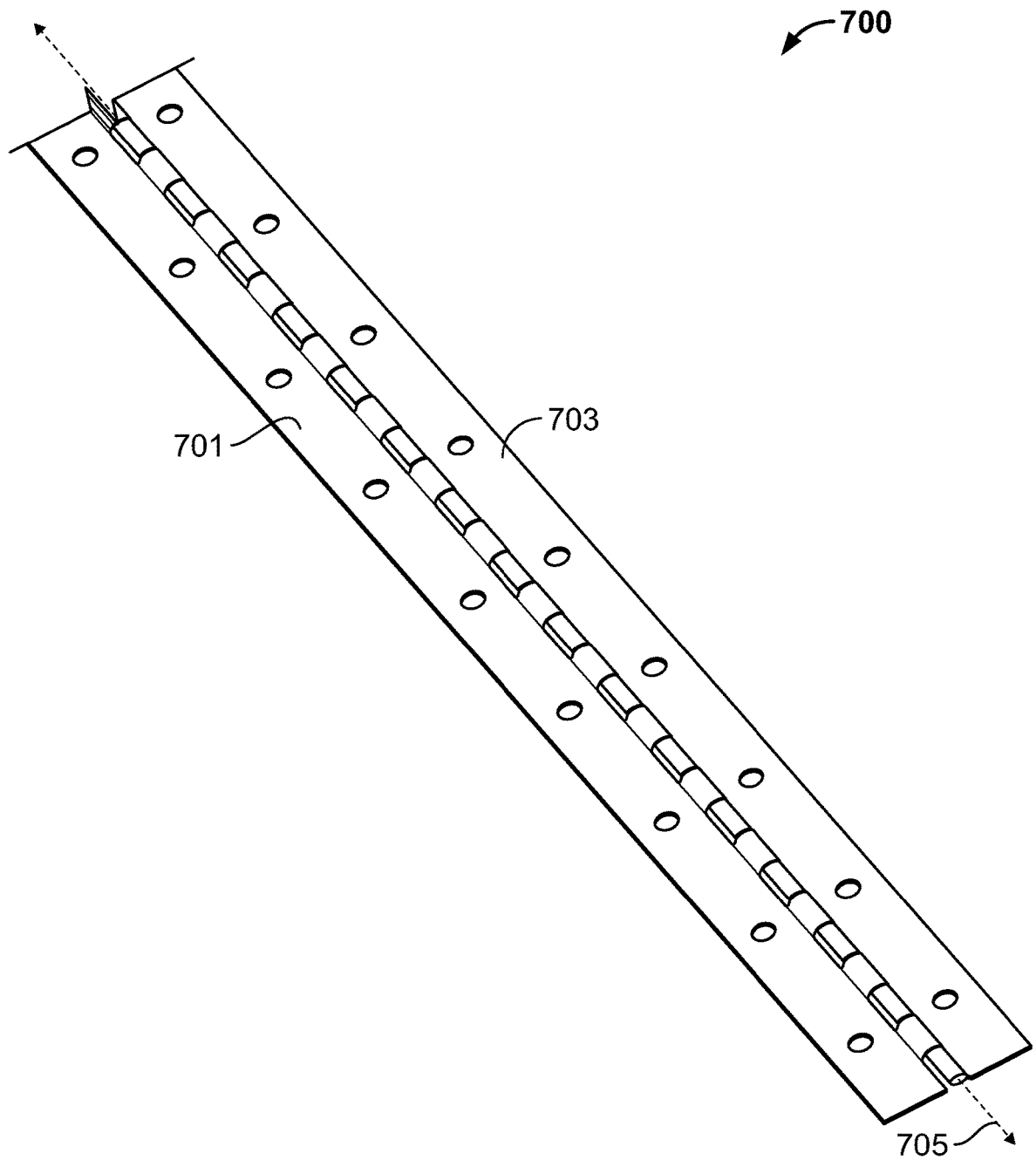
FIG. 7 shows yet another illustrative apparatus in accordance with principles of the disclosure.

FIG. 7 shows illustrative hinge 700 in accordance with principles of the disclosure. Hinge 700 may be, or may be similar to, one of the first set of hinges. In particular, hinge 700 may be a piano hinge. Hinge 700 may include first leaf 701 and second leaf 703 which may be interconnected. Hinge 700 may define, and may fold about, longitudinal axis 705.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures relating to design or implementation of apparatus designs as disclosed herein.

Thus, methods and systems for transportable sofas are provided. Persons skilled in the art will appreciate that the present invention can be practiced by other than the described embodiments, which are presented for purposes of illustration rather than of limitation, and that the present invention is limited only by the claims that follow.

What is claimed is:

1. A transportable sofa, the sofa comprising:
a seating unit that comprises:
a base that defines a front edge, a left edge, a right edge, and a rear edge;
a back that defines a bottom edge, a left edge, a right edge, and a top edge;
a set of hinges that define a longitudinal axis and connect the rear edge of the base to the bottom edge of the back along the longitudinal axis such that:
in a folded position the back lies in a substantially flat position wherein the top edge of the back rests atop the base; and
the back unfolds to an unfolded position by swinging the top edge of the back upward and pivoting the back about the longitudinal axis into a substantially upright position; and
a set of support mechanisms, wherein, when the back is in the unfolded position, the set of support mechanisms provide structural support for the back in the substantially upright position and prevent the back from pivoting further backwards about the longitudinal axis;
a right armrest unit; and
a left armrest unit;
wherein:
the right armrest unit is attachable to the right edge of the base; and
the left armrest unit is attachable to the left edge of the base
the set of support mechanisms comprises a left side hinge and a right side hinge;
the left side hinge comprises a first arm portion that is connected to the left edge of the back and a second arm portion that is connected to the left edge of the base, and the first arm portion of the left side hinge is connected to the second arm portion of the left side hinge at a pivot point;
the right side hinge comprises a first arm portion that is connected to the right edge of the back and a second arm portion that is connected to the right edge of the base, and the first arm portion of the right side hinge is connected to the second arm portion of the right side hinge at a pivot point; and
the left side hinge and the right side hinge:
fold at the pivot points when the back is in the folded position; and
unfold at the pivot points when the back is in the unfolded position.

2. The sofa of claim 1, wherein the set of support mechanisms are invisible to a viewer when the sofa is fully assembled.

3. The sofa of claim 1, wherein:
the right armrest unit is attachable via screws to the right edge of the base; and
the left armrest unit is attachable via screws to the left edge of the base.

4. The sofa of claim 1, wherein:
the right armrest unit is attachable via brackets to the right edge of the base; and
the left armrest unit is attachable via brackets to the left edge of the base.

5. The sofa of claim 1 further comprising a plurality of legs, wherein:
each leg comprises a threaded rod extending from a top of the leg;
the right armrest unit and the left armrest unit include a plurality of pre-drilled sockets that are configured to accept the threaded rods; and
the plurality of legs are configured to be installed in the sofa, independently of any fasteners aside from the threaded rods, via the threaded rods screwing into the pre-drilled sockets.

6. The sofa of claim 1 further comprising a plurality of legs, wherein the plurality of legs is attachable, via brackets and/or screws, to the armrest units and/or the base.

7. The sofa of claim 1 further comprising a plurality of cushions, the plurality of cushions comprising a set of bottom cushions and a set of back cushions, wherein:
the set of bottom cushions are configured to be installed in a flat position atop the base when the back is in the unfolded position; and
the set of back cushions are configured to be installed in an upright position against the back when the back is in the unfolded position.

8. The sofa of claim 1 wherein:
the sofa further comprises cushions and legs;
in an assembled form, the sofa has dimensions of 23" D×57.5" W×30.5" H, wherein, in the assembled form, the back is in the unfolded position, the right and left armrest units are attached to the base, and the cushions and legs are installed; and in a disassembled form, the sofa fits in a single box that has dimensions of 51" ×23" ×14", wherein, in the disassembled form, the back is in the folded position, the right and left armrest units are unattached to the base, and the cushions and legs are uninstalled.

9. The sofa of claim 1 wherein the sofa is provided to a customer in a disassembled form and completing assembly of the sofa comprises:
   unfolding the back from the folded position to the unfolded position;
   attaching the right and left armrest units to the base; and
   installing cushions and legs.

10. The sofa of claim 1 wherein the set of hinges comprises one or more piano hinges.

11. The sofa of claim 10 wherein the one or more piano hinges comprises three piano hinges, and each piano hinge:
   is 9 10/16" long; and
   is split along the longitudinal axis into two adjoining leaves that are each 10/16" wide.

12. The sofa of claim 1 wherein the left side hinge and the right side hinge are pivot hinges.

13. The sofa of claim 1 wherein the back is less than 2" thick.

14. A method for providing a sofa with a large footprint in small packaging, the method comprising:
   attaching a back to a base with a first set of hinges and a second set of hinges to form a seating unit, wherein:
      the base defines a front edge, a left edge, a right edge, and a rear edge;
      the back defines a bottom edge, a left edge, a right edge, and a top edge;
      the first set of hinges define a longitudinal axis and connect the rear edge of the base to the bottom edge of the back along the longitudinal axis such that:
         in a folded position the back lies in a substantially flat position wherein the top edge of the back rests atop the base; and
         the back unfolds to an unfolded position by swinging the top edge of the back upward and pivoting the back about the longitudinal axis into a substantially upright position; and
      the second set of hinges comprise a left side hinge and a right side hinge, wherein:
         the left side hinge comprises a first arm portion that is connected to the left edge of the back and a second arm portion that is connected to the left edge of the base, and the first arm portion of the left side hinge is connected to the second arm portion of the left side hinge at a pivot point;
         the right side hinge comprises a first arm portion that is connected to the right edge of the back and a second arm portion that is connected to the right edge of the base, and the first arm portion of the right side hinge is connected to the second arm portion of the right side hinge at a pivot point; and
         the left side hinge and the right side hinge:
            fold at the pivot points when the back is in the folded position;
            unfold at the pivot points when the back is in the unfolded position; and
            when the back is in the unfolded position, the left side hinge and the right side hinge secure the back in the substantially upright position and prevent the back from pivoting further backwards about the longitudinal axis;
   folding the back into the folded position;
   placing the folded seating unit in a box with maximum dimensions of 51"×23"×14";
   placing in the box a right armrest unit and a left armrest unit, wherein:
      the right armrest unit is attachable to the right edge of the base; and
      the left armrest unit is attachable to the left edge of the base;
   placing in the box a plurality of legs, wherein:
      each leg comprises a threaded rod extending from a top of the leg;
      the right armrest unit and the left armrest unit include a plurality of pre-drilled sockets that are configured to accept the threaded rods; and
      the plurality of legs are configured to be installed in the sofa, independently of any fasteners aside from the threaded rods, via the threaded rods screwing into the pre-drilled sockets; and
   placing in the box a plurality of cushions, the plurality of cushions comprising a set of bottom cushions and a set of back cushions, wherein:
      the set of bottom cushions are configured to be installed in a flat position atop the base when the back is in the unfolded position; and
      the set of back cushions are configured to be installed in an upright position against the back when the back is in the unfolded position.

15. The method of claim 14 wherein:
   in an assembled form, the sofa has dimensions of 23" D×57.5" W×30.5" H; and
   in the assembled form, the back is in the unfolded position, the right and left armrest units are attached to the base, and the cushions and legs are installed.

16. The method of claim 14 wherein the sofa is provided to a customer in a disassembled form in the box, and completing assembly of the sofa comprises:
   unfolding the back from the folded position to the unfolded position;
   attaching the right and left armrest units to the base via screws; and
   installing the cushions and the legs.

17. The method of claim 14 wherein the first set of hinges comprises one or more piano hinges.

18. The method of claim 17 wherein the one or more piano hinges comprises three piano hinges, and each piano hinge:
   is 9 10/16" long; and
   is split along the longitudinal axis into two adjoining leaves that are each 10/16" wide.

19. The method of claim 14 wherein the left side hinge and the right side hinge are pivot hinges.

20. The method of claim 14 wherein the back is less than 2" thick.

21. A kit for assembling a sofa, the kit comprising:
   a seating unit that comprises:
      a base that defines a front edge, a left edge, a right edge, and a rear edge;
      a back that defines a bottom edge, a left edge, a right edge, and a top edge;
      a first set of hinges that define a longitudinal axis and connect the rear edge of the base to the bottom edge of the back along the longitudinal axis such that:
         in a folded position the back lies in a substantially flat position wherein the top edge of the back rests atop the base; and
         the back unfolds to an unfolded position by swinging the top edge of the back upward and pivoting the back about the longitudinal axis into a substantially upright position; and a second set of hinges comprising a left side hinge and a right side hinge, wherein:
the left side hinge comprises a first arm portion that is connected to the left edge of the back and a second arm portion that is connected to the left edge of the base, and the first arm portion of the left side hinge is connected to the second arm portion of the left side hinge at a pivot point;
the right side hinge comprises a first arm portion that is connected to the right edge of the back and a second arm portion that is connected to the right edge of the base, and the first arm portion of the right side hinge is connected to the second arm portion of the right side hinge at a pivot point; and
the left side hinge and the right side hinge:
fold at the pivot points when the back is in the folded position;
unfold at the pivot points when the back is in the unfolded position; and
when the back is in the unfolded position, the left side hinge and the right side hinge secure the back in the substantially upright position and prevent the back from pivoting further backwards about the longitudinal axis;

a right armrest unit and a left armrest unit, wherein the right armrest unit is attachable to the right edge of the base and the left armrest unit is attachable to the left edge of the base;

a plurality of legs, wherein:
each leg comprises a threaded rod extending from a top of the leg;
the right armrest unit and the left armrest unit include a plurality of pre-drilled sockets that are configured to accept the threaded rods; and
the plurality of legs are configured to be installed in the sofa, independently of any fasteners aside from the threaded rods, via the threaded rods screwing into the pre-drilled sockets; and a plurality of cushions, the plurality of cushions comprising a set of bottom cushions and a set of back cushions, wherein:
the set of bottom cushions are configured to be installed in a flat position atop the base when the back is in the unfolded position; and
the set of back cushions are configured to be installed in an upright position against the back when the back is in the unfolded position;

wherein:
in an assembled form, the sofa has dimensions of 23" D×57.5" W×30.5" H, wherein, in the assembled form, the back is in the unfolded position, the right and left armrest units are attached to the base, and the cushions and legs are installed;
in a disassembled form, the sofa fits in a single box that has dimensions of 51"×23"×14", wherein, in the disassembled form, the back is in the folded position, the right and left armrest units are unattached to the base, and the cushions and legs are uninstalled; and
the sofa is provided to a customer in a disassembled form and completing assembly of the sofa comprises:

unfolding the back from the folded position to the unfolded position;
attaching the right and left armrest units to the base;
installing the cushions; and
installing the legs by screwing the threaded rods into the pre-drilled sockets.

22. The kit of claim 21 wherein:
the first set of hinges comprises one or more piano hinges; and
the left side hinge and the right side hinge are pivot hinges.

23. The kit of claim 22 wherein the one or more piano hinges comprises three piano hinges, and each piano hinge:
is 9 10/16" long; and
is split along the longitudinal axis into two adjoining leaves that are each 10/16" wide.

24. The kit of claim 21 wherein the back is less than 2" thick.

25. A transportable sofa, the sofa comprising:
a base;
a back that folds down;
a right armrest unit;
a left armrest unit;
a left side strap comprising a first end that is connected to a left edge of the back and a second end that is connected to a left edge of the base;
a right side strap comprising a first end that is connected to a right edge of the back and a second end that is connected to a right edge of the base;
wherein the left side strap and the right side strap:
fold when the back is in a folded position;
unfold when the back is in an unfolded position; and
when the back is in the unfolded position, the left side strap and the right side strap secure the back in an upright position and prevent the back from pivoting further backwards about a longitudinal axis;
a plurality of legs that are configured to be attached at a bottom of the sofa; and
a plurality of cushions that are configured to cover the base and/or the back; wherein:
in an assembled form, the sofa has dimensions that include a depth of at least 20", a width of at least 50", and a height of at least 25"; and
in a disassembled form, the sofa fits in a single box, wherein:
a length of the box is less than 108"; and
two times a width of the box plus two times a height of the box plus the length of the box, is less than 165".

26. The sofa of claim 25, wherein:
the length of the box is less than 96"; and
two times a width of the single box plus two times a height of the single box plus a length of the box, is less than 130".

27. The sofa of claim 25,
wherein:
the dimensions of the sofa in the disassembled form are substantially 23" D×57.5" W×30.5" H; and
the box has maximum dimensions of 51"×23"×14".

* * * * *